Figure 1:
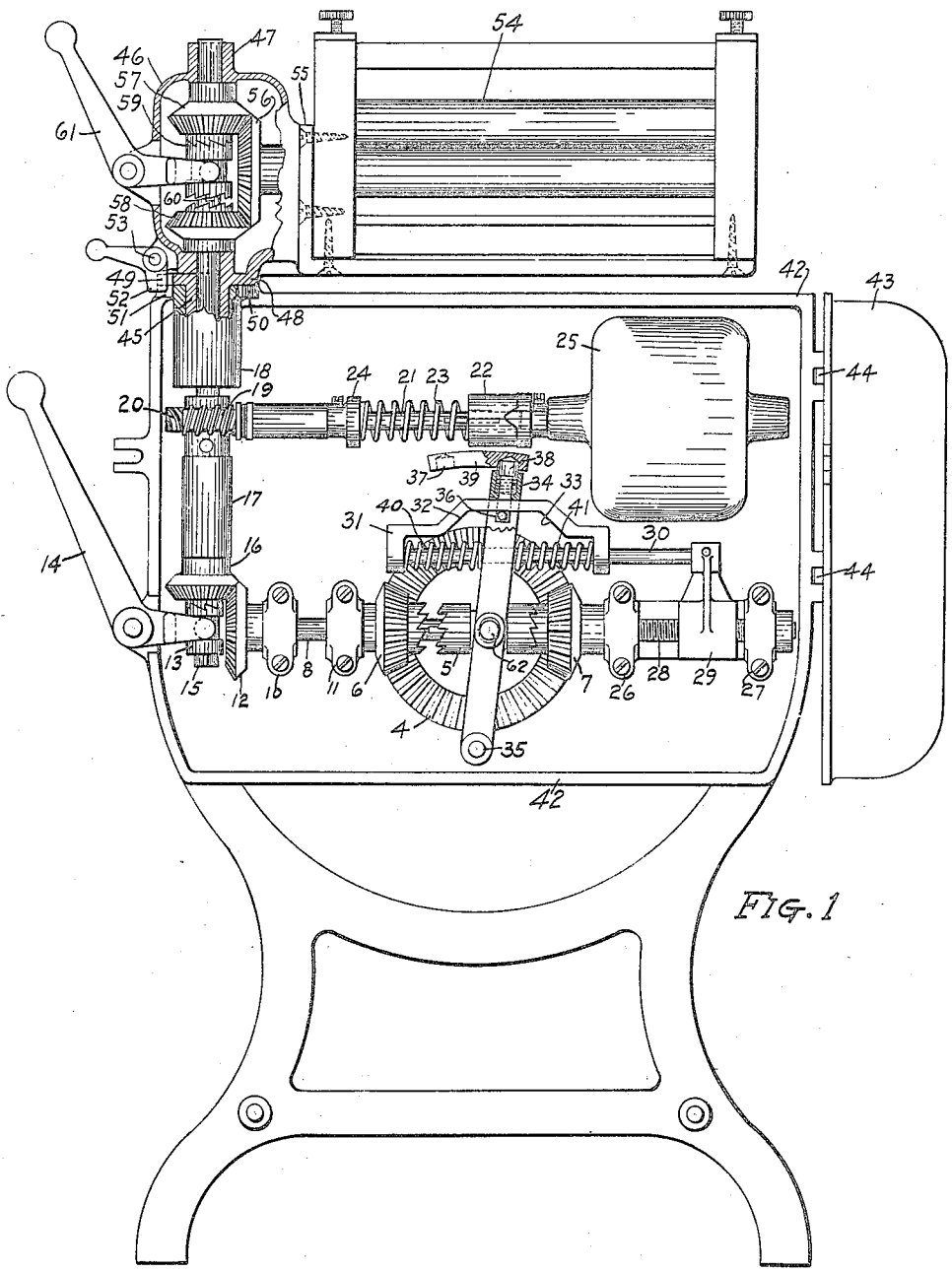

H. H. LYCHE.
GEARING FOR WASHING MACHINES.
APPLICATION FILED JAN. 20, 1916.

1,209,981.

Patented Dec. 26, 1916.
2 SHEETS—SHEET 1.

WITNESSES
Albert S. Kurz
B. C. Rinehart

INVENTOR
Halvor H. Lyche

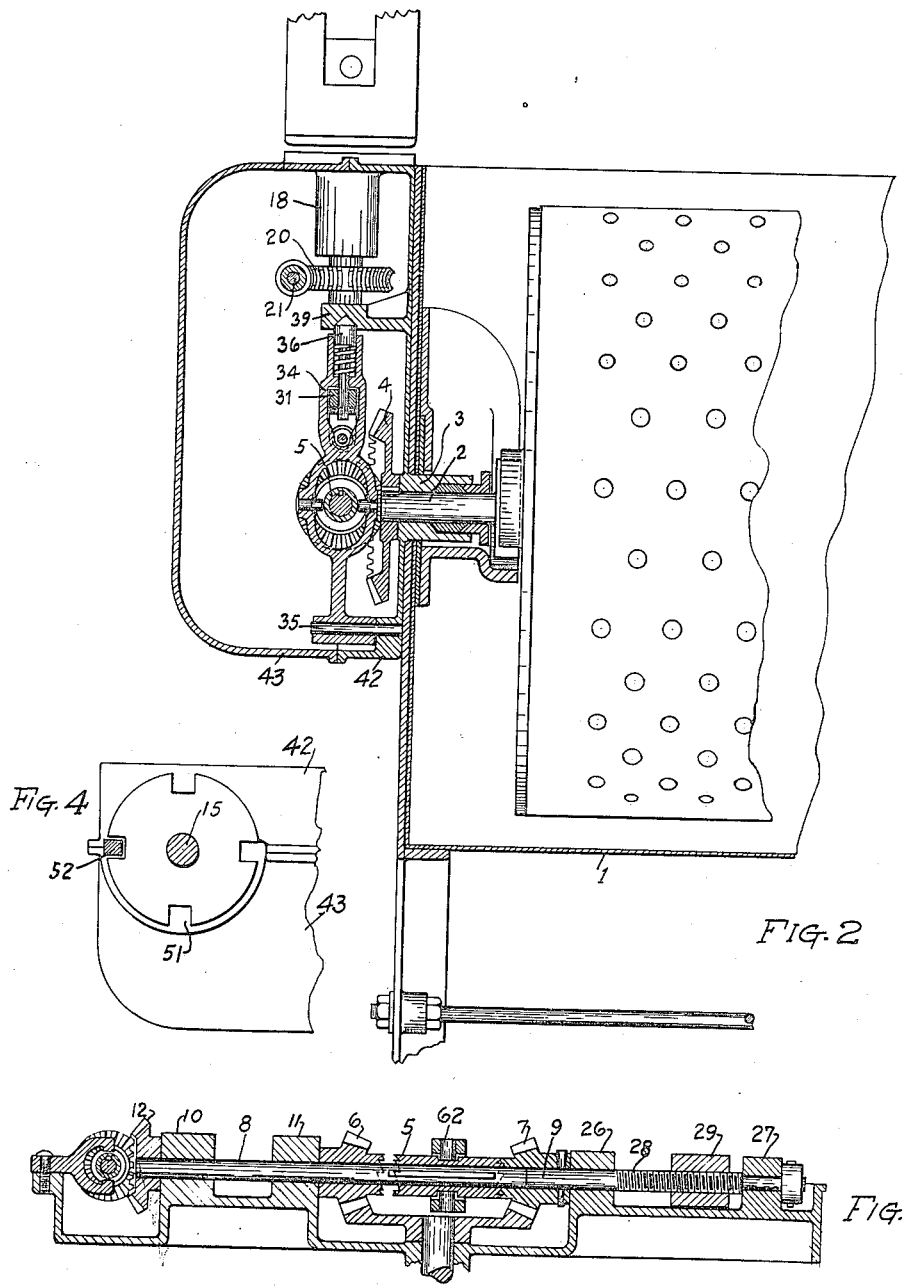

UNITED STATES PATENT OFFICE.

HALVOR H. LYCHE, OF CHICAGO, ILLINOIS, ASSIGNOR TO THE ODIN COMPANY, OF CHICAGO, ILLINOIS, A CORPORATION OF ILLINOIS.

GEARING FOR WASHING-MACHINES.

1,209,981.

Specification of Letters Patent.   Patented Dec. 26, 1916.

Application filed January 20, 1916.   Serial No. 73,262.

*To all whom it may concern:*

Be it known that I, HALVOR H. LYCHE, a citizen of the United States, residing at Chicago, in the county of Cook and State of Illinois, have invented a new and useful Improvement in Gearing for Washing-Machines, of which the following is a specification.

My invention relates to an improved design for alternating, revolutionary motion, such as is common to washing machines; also a compact and completely incased driving unit, which is strong and durable of construction, positive in operation, cheap to manufacture and readily accessible for lubrication, inspection or repairs.

The objects of my invention are primarily to construct an effective, directly-connected and entirely inclosed mechanical movement and motor combined for washing machines, a wringer pivotally mounted and readily adjustable for various positions and an incased, reversible wringer driving gear, any of which may be controlled, independent of the other by suitable means convenient to the operator.

I attain these objects by the mechanism illustrated in the accompanying drawings in which: Fig. 1. is an end elevation of a washing machine, exposing the several parts of my invention to view. Fig. 2. is a side view showing a portion of the mechanism in section. Fig. 3. is a horizontal, sectional view through the cylinder driving gear. Fig. 4. is a horizontal, sectional view through the wringer-pivot, showing means for holding the wringer in various positions in relation to the washing machine. Similar numerals refer to similar parts throughout the several views.

A washing machine 1, and its driving stud 2, rotating in a bearing 3, are of the ordinary construction. A bevel gear 4, keyed to the aforesaid shaft is constantly driven in an alternating, rotary motion by the action of a clutch 5, first on one and then the other of two bevel gears 6 and 7, revolving on a parted shaft 8 and 9. The shaft 8, supported in the bearings 10 and 11 and in the gear 7, is driven by means of gear 12, fastened to the said shaft. A clutch 13, operated by suitable means, in this drawing indicated by a hand lever 14, is mounted slidably to rotate with a shaft 15, and to permit of being thrown in and out of driving contact with the gear 16, which is loosely mounted on the same shaft and is in constant mesh with the gear 12.

I have shown suitable bearings 17 and 18 to carry the shaft 15, which is driven by a worm 19, and gear 20, through the means of a shaft 21, on which is mounted slidably one member of a tension clutch 22, spring 23, and tension adjusting collar 24; the driving member of the said clutch is mounted on the driving shaft of a motor 25, or other means of propulsion.

The shaft 9, which is in line with the shaft 8, and works in the bearings 26 and 27, is fastened to the gear 7, as shown in Fig. 3.

A portion of this shaft is threaded at 28, to screw into and carry a nut 29, on which is fixed a rod 30, to which is affixed the cam bracket 31.

The aforesaid rod passes through a lever 34, which is pivoted at 35, and has a spring bolt 36, protruding from the other end to enter alternately recesses 37 and 38, in a member 39, which is fastened to the casing. The pins 62, in the lever 34, enter a groove in the clutch 5, to operate the same.

The rod 30 also carries the springs 40 and 41 each of which acts between the lever 34 and the cam bracket 31 and serves to perform a practically instantaneous change of the clutch 5 in its reciprocating motion between the gears 6 and 7.

All of the aforesaid gearing and motor are within the casing 42, which is provided with a cover 43, swung on hinges 44, which serves to substantially incase the moving parts.

One end of the shaft 15, extends through the casing, having its bearing at 45 and also at 17.

The housing 46 is designed with a flange 48, having a recess 49, and bears against a similar flange 50, with several recesses 51. I show a latch 52, pivoted at 53, which serves to lock the wringer in position.

Thus it is clear that the wringer 54, which is mounted on a flange 55, of the housing 47, may be rigidly set in any desired position with relation to the washing machine without interference with the operation of the same.

The wringer gear 56 is in mesh with two bevel gears 57 and 58 loosely mounted on the shaft 15; interposed between the gears 57 and 58 is a clutch 59, driven by means of a key 60, in said shaft and having suitable connections with a controlling handle 61, by means of which the wringer may be operated in either direction or thrown out of use at the option of the operator.

In operation an excessive load may force the tension clutch 22, against the spring 23, and thus relieve the gearing from any undue strain.

Normally however power is transmitted from the motor through the means of this tension clutch, the shaft 21, worm 19, gear 20, shaft 15, clutch 13, gears 16 and 12, the shaft 8, clutch 5, and successively the gears 6 and 7 imparting an alternating revolutionary motion to the gear 4, operating the washing machine.

On the drawing the gear 7, is being driven by the clutch 5, and moving the nut 29, rod 30 and cam bracket 31, thereby compressing the spring 41, against the lever 34, until the cam surface 33 pulls the spring bolt 36 out of engagement with the recess 38; whereby the aforesaid lever 34 is forced to the opposite position, with the bolt 36, engaging the recess 37 and the clutch 5, engaging the gear 6, which in turn will drive the gear 4, and through the gear 7, the screw 28, in a reverse direction until the cam surface 32 disengages the spring bolt 36 from the recess 37 and a reverse action of the lever 34 and the engaging parts take place.

I am aware that prior to my invention washing machines have been driven with alternating movements. I therefore do not claim such a combination broadly, but I claim:

1. In a reversing mechanism, the combination of a drive shaft, pinions loose on said shaft, one of said pinions provided with a shaft extension, a driven gear adapted to be alternately rotated in opposite directions by said shaft through said pinions, a clutch device for alternately locking the pinions to the shaft including a shiftable lever, and a shifting device for said lever mounted on and actuated by said shaft extension.

2. In a device of the character described, the combination of a driving shaft, a driven shaft, reversing gearing therefor actuated by said driving shaft and comprising meshed driving and driven gear elements and a clutch therefor, a reciprocable nut operated by one of said gear elements, and a shifting device for said clutch adapted to be actuated by said nut to shift the clutch.

3. In a driving mechanism, the combination of a driven element, a driving shaft, driving elements on said shaft and meshing with said driven element, a clutch device for said driving elements, a shifting device directly actuated by one of said driving elements and constructed for shifting the clutch into alternate engagement with the driving elements and thereby impart opposite rotation to said driven element, and means for yieldingly holding the clutch device in a shifted position.

4. In a device of the class described, the combination of a support, a sectional shaft journaled thereon, a nut movable on one shaft part and having a rod fixed thereto, a driven gear on the support, driving gears loosely carried by the said sectional shaft and in mesh with the driven gear, a clutch device for said gears, a lever pivotally connected to the support and operable to actuate the clutch device to alternately rotate the gears in opposite directions, means carried by the rod for alternately shifting the lever, means for alternately holding the lever in shifted position, and means for driving said shaft.

5. The combination with a support, of a gear rotatably mounted on the support, a sectional driving shaft mounted on the support and having pinions in mesh with said gear, a nut movable along the said shaft, a rod carried by the nut, a cam bracket fixed to the rod, a lever having its lower end pivotally connected to the support, a spring pressed latch carried by the upper end of the lever, said rod being slidable through the lever, springs on the rod and having their inner ends engaging the lever and their outer ends engaging the said cam bracket, a plate fixed to the support and having recesses formed therein, means for rotating the shaft, means carried by the lever for alternately driving the pinions in opposite directions for correspondingly rotating said gears, said nut being movable longitudinally on the shaft whereby the cam bracket actuates the latch to alternately engage said recesses.

6. In combination, a driving shaft, driving pinions loosely mounted on the shaft, a clutch for alternately locking the pinions to the shaft, a lever for operating the clutch, a cam bracket movable longitudinally of the shaft during the rotation thereof and provided with oppositely disposed cams, a latch carried by the lever, a member having recesses formed therein, said latch being alternately disengageable from the recesses upon engagement of the cams with the latch, and yieldable means operable by the bracket to alternately shift the lever and thereby operate the clutch to alternately lock the pinions to the shaft.

7. In a device of the character described, the combination of a driving shaft, a driven shaft, reversing gearing therefor actuated by said driving shaft and comprising meshed driving and driven gear elements and a clutch therefor, a reciprocable nut operated by one of said gear elements, a shifting device for said clutch adapted to be actuated by said nut to shift the clutch, and means for maintaining the clutch in a shifted position.

HALVOR H. LYCHE.

Witnesses:
 FRANK H. BRUN,
 B. C. RINEHART.